A. C. HINCKLEY.
CLEANER FOR GAGE AND WATER GLASS COCKS.
APPLICATION FILED JAN. 21, 1913.
1,069,013.
Patented July 29, 1913.
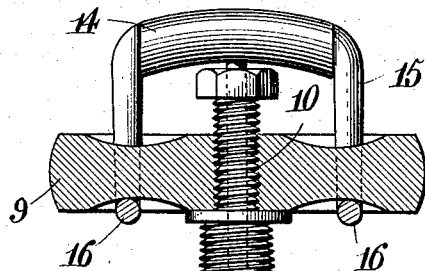
Fig. 1.
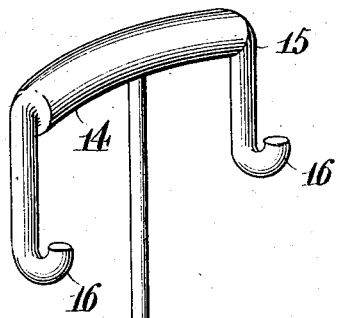
Fig. 2.
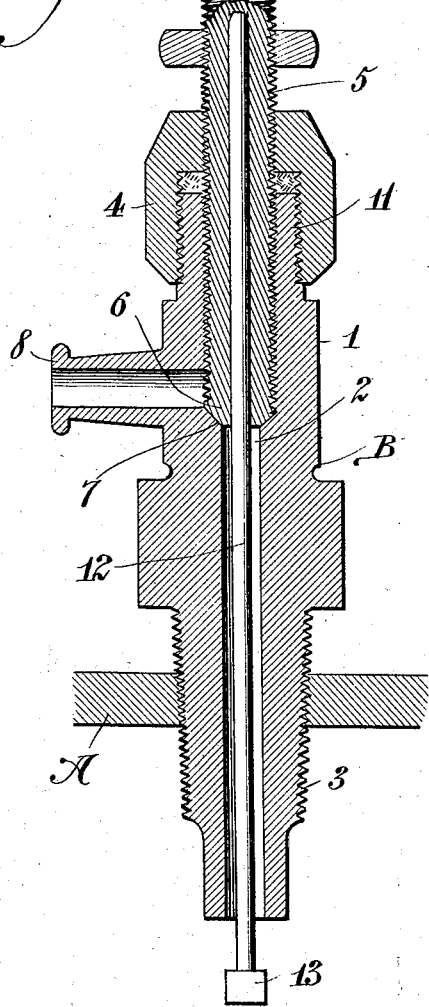
Witnesses:
Christ Feinle, Jr.,
John J. McCarthy
Inventor,
A. C. Hinckley.
By Victor J. Evans,
Attorney.

UNITED STATES PATENT OFFICE.

AUGUSTUS C. HINCKLEY, OF OAKLAND PIER, CALIFORNIA.

CLEANER FOR GAGE AND WATER-GLASS COCKS.

1,069,013.  Specification of Letters Patent.  Patented July 29, 1913.

Application filed January 21, 1913. Serial No. 743,384.

*To all whom it may concern:*

Be it known that I, AUGUSTUS C. HINCKLEY, a citizen of the United States, residing at Oakland Pier, in the county of Alameda and State of California, have invented new and useful Improvements in Cleaners for Gage and Water-Glass Cocks, of which the following is a specification.

This invention relates to improvements in gage cock and water glass cock cleaners and has particular application to a device of the class described which forms, in effect, a part of the gage cock.

In carrying out the present invention, it is my purpose to provide a gage cock and water glass cock cleaner which will be operative under all conditions and whereby the gage cock may be cleaned of scale, sediment and the like irrespective of the water within the boiler or the steam pressure.

It is also my purpose to provide a cleaner of the class described which may be readily applied to any type of gage cock now in use without materially changing the construction of such cock and which will form in effect a permanent part of the cock so that the latter may be readily and easily cleaned at all times.

Furthermore, it is my intention to provide a gage cock and water glass cock cleaner which will embrace the desired features of simplicity, efficiency and durability coupled with cheapness of cost in manufacture and marketing and which may be readily applied to the gage cock and quickly manipulated.

With the above and other objects in view, the invention consists in the construction, combination and arrangement of parts hereinafter set forth in and falling within the scope of the claims.

In the accompanying drawing: Figure 1 is a view in elevation of a gage cock equipped with my present invention, parts being shown in section. Fig. 2 is a perspective view of the cleaner removed from the gage cock.

Referring now to the accompanying drawing in detail, A indicates a portion of the shell of a boiler provided with a threaded aperture, as usual, through which is passed a gage cock indicated as an entirety by the letter B. In the present instance, this gage cock comprises a body 1 having a longitudinal bore 2 formed therein and provided at one end with a threaded extension 3 designed to engage the threads in the wall of the opening in the boiler shell and at its opposite end with a packing nut 4 alining axially with the bore 2 and receiving the stem 5 of a valve 6 adapted to engage a seat 7 formed in the wall of the bore 2, while extending laterally from the body is a nipple 8 in open communication with the bore 2 at a point beyond the valve seat 7 and adapted to receive one end of a water glass as usual. The stem 5 is equipped with some suitable form of operating device such, for instance, as a hand wheel 9 and is formed with a longitudinal bore 10 axially alining with the bore 2 in the body 1, the valve stem being also formed with an enlarged threaded portion 11 designed to threadedly engage the inner wall of the body 1. By manipulating the hand wheel 9, the stem 10 may be rotated and, owing to the threaded enlarged portion 11 thereof engaging the inner wall of the body 1, the valve 6 will be moved to open or closed position according to the movement of the shank.

In order that the gage cock may be cleaned without necessitating disassembling of the parts thereof or blowing out the boiler, I employ a cleaner composed, in the present instance, of an elongated shank 12 disposed within the bores 10 and 2 in the valve stem and the body of the gage cock respectively and formed at one end with a cutter or scraper blade 13 adapted to be manipulated within the bore 2 of the body 1 between the valve seat and the free end of the extension 3. The opposite end of the shank 12 extends outwardly of the bore 10 and is formed with an eye 14 encircling the interconnecting member of a substantially U-shaped handle 15 having the free extremities of the limbs thereof bent to form anchor hooks 16 designed to engage the spokes of the hand wheel 9 so as to prevent accidental movement of the cleaner.

From the foregoing description taken in connection with the accompanying drawing, the construction, mode of operation and manner of employing my invention will be readily apparent. Assuming the parts to be assembled as shown in Fig. 1 and it is desired to clean the gage cock, the handle 15 of the cleaner is manipulated to release the anchor hooks 16 from the spokes of the hand wheel thereby permitting the shank 12 and the scraper or cutter 13 carried by the free end thereof to be reciprocated back and forth and rotated within the respective portion of the bore 2 whereby scale, sediment and other foreign matter will be removed from the walls of the bore.

It will be seen that the cleaner forms in effect a permanent part of the gage cock and may be actuated to clean the cock at any time irrespective of the condition of the gage cock.

While I have herein shown and described one preferred form of my invention by way of illustration, I desire to have it understood that I do not limit or confine myself to the precise details of construction herein described and delineated, as modification and variation may be made within the scope of the claims and without departing from the spirit of the invention.

I claim:

1. The combination with a gage cock including a body and a valve stem formed with axially alining bores, of a cleaner comprising a shank mounted within said bores and adapted to be reciprocated and rotated therein, a scraper at one end of said shank, a manipulating handle at the opposite end of said shank, and means carried by said handle and adapted to engage the manipulating member of the valve stem to hold the cleaner against accidental movement.

2. The combination with a gage cock including a body and a valve stem formed with axially alining bores, of a cleaner slidably mounted within said bores and adapted to be reciprocated and rotated therein, and a substantially U-shaped handle at the outer end of said cleaner and provided with anchor hooks adapted to engage the manipulating member of the valve stem to hold the cleaner against accidental movement.

In testimony whereof I affix my signature in presence of two witnesses.

AUGUSTUS C. HINCKLEY.

Witnesses:
ERNEST HENDRICKS NOFFINGER,
JAMES EVERETT PARISH.

---

Copies of this patent may be obtained for five cents each, by addressing the "Commissioner of Patents, Washington, D. C."